United States Patent
Krishna et al.

(10) Patent No.: US 12,531,797 B2
(45) Date of Patent: Jan. 20, 2026

(54) EFFICIENT LIVENESS DETECTION IN A MANAGEMENT NETWORK

(71) Applicant: MICRO FOCUS LLC, Santa Clara, CA (US)

(72) Inventors: Vamsi Krishna, Bangalore (IN); Ashoka Shetty, Bangalore (IN); Harinath Jarugula, Bangalore (IN)

(73) Assignee: Micro Focus LLC, Santa Clara, CA (US)

(*) Notice: Subject to any disclaimer, the term of this patent is extended or adjusted under 35 U.S.C. 154(b) by 37 days.

(21) Appl. No.: 17/977,962

(22) Filed: Oct. 31, 2022

(65) Prior Publication Data

US 2024/0146630 A1    May 2, 2024

(51) Int. Cl.
*H04L 43/0817* (2022.01)
*H04L 41/0663* (2022.01)
*H04L 41/0668* (2022.01)
*H04L 41/0893* (2022.01)
*H04L 43/10* (2022.01)

(52) U.S. Cl.
CPC ...... *H04L 43/0817* (2013.01); *H04L 41/0663* (2013.01); *H04L 43/10* (2013.01)

(58) Field of Classification Search
CPC . H04L 43/0817; H04L 41/0663; H04L 43/10; H04L 41/0668; H04L 41/0893
See application file for complete search history.

(56) References Cited

U.S. PATENT DOCUMENTS

| | | | |
|---|---|---|---|
| 10,122,621 B2 | 11/2018 | Schreter | |
| 10,243,780 B2* | 3/2019 | Shang | ............... H04L 41/0654 |
| 10,896,104 B2 | 1/2021 | Sanakkayala | |
| 2009/0259741 A1* | 10/2009 | Shen | .................. G06F 11/0757 |
| | | | 709/223 |
| 2014/0379900 A1* | 12/2014 | Dasgupta | ............... H04L 43/10 |
| | | | 709/224 |
| 2018/0234893 A1* | 8/2018 | Xhafa | ..................... H04W 8/26 |

OTHER PUBLICATIONS

Title: "An Overlay Resource Monitor System" Author: Wang et al. (Year: 2006).*
Title: "Scalable Group Management in Large-Scale Virtualized Clusters" Author: Zhou et al. (Year: 2010).*
Title: "Title: Title: SDesign and Implementation of High Availability Distributed System Based on Multi-level Heartbeat Protocol" Author: Li et al. Publisher: IEEE (Year: 2009).*

* cited by examiner

*Primary Examiner* — Kamal M Hossain
(74) *Attorney, Agent, or Firm* — Sheridan Ross P.C.

(57) ABSTRACT

A request is received by a network management server, from a managed node, to get cluster information. The cluster information identifies a coordinator node and a leader node (a node hierarchy) that are used to track liveness of the managed node. The coordinator node and the leader node may be identified based on being in the same location as the managed node. The cluster information is sent to the managed node to make the managed node aware of the hierarchy. The coordinator node consolidates liveness of the nodes in its grouping in the cluster. The coordinator node sends a first liveness message of the managed node to the leader node. The leader consolidates a group of coordinator nodes by sending a second liveness message of the managed node to the network management server. This gives the network management server a status of all the managed nodes in the cluster.

20 Claims, 5 Drawing Sheets

EFFICIENT LIVENESS DETECTION IN A MANAGEMENT NETWORK

FIELD

The disclosure relates generally to network management and particularly to detection of dynamic devices on a managed network.

BACKGROUND

Managed nodes can be spread across multiple geographical locations and separated by various topologies such as Proxy servers, Network Address Translators (NAT), etc. Detecting a server-initiated liveness is often times difficult as the server cannot reach out to some of the managed nodes in these kinds of topologies. For example, mobile devices may appear in different locations within a corporate network. In addition, when the number of the managed nodes is high, detecting the liveliness of a large number of managed nodes typically will involve a high number of resources such as sockets, memory, and connections, which might be prohibitively costly or unrealistic.

SUMMARY

These and other needs are addressed by the various embodiments and configurations of the present disclosure. The present disclosure can provide a number of advantages depending on the particular configuration. These and other advantages will be apparent from the disclosure contained herein.

A request is received by a network management server from a managed node submitting its coordinates. The network management server dynamically creates clusters of the group of devices using the coordinates such as location. The cluster information identifies the coordinator node and a leader node (a node hierarchy) that are used to track the liveness of the managed node. The cluster information is sent to the managed node. The coordinator node consolidates liveness of the nodes in its grouping in cluster. The coordinator node sends a first liveness message of the managed node to the leader node. The leader consolidates a group of coordinator nodes by sending a second liveness message of the managed node to the network management server. This gives the network management server a status of all the managed nodes in the cluster.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein, the term "cluster information" may include node information, coordinator node information, leader node information, network management server information, location information, network information, device information (e.g., processing capability, memory, etc.), device type, address information, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
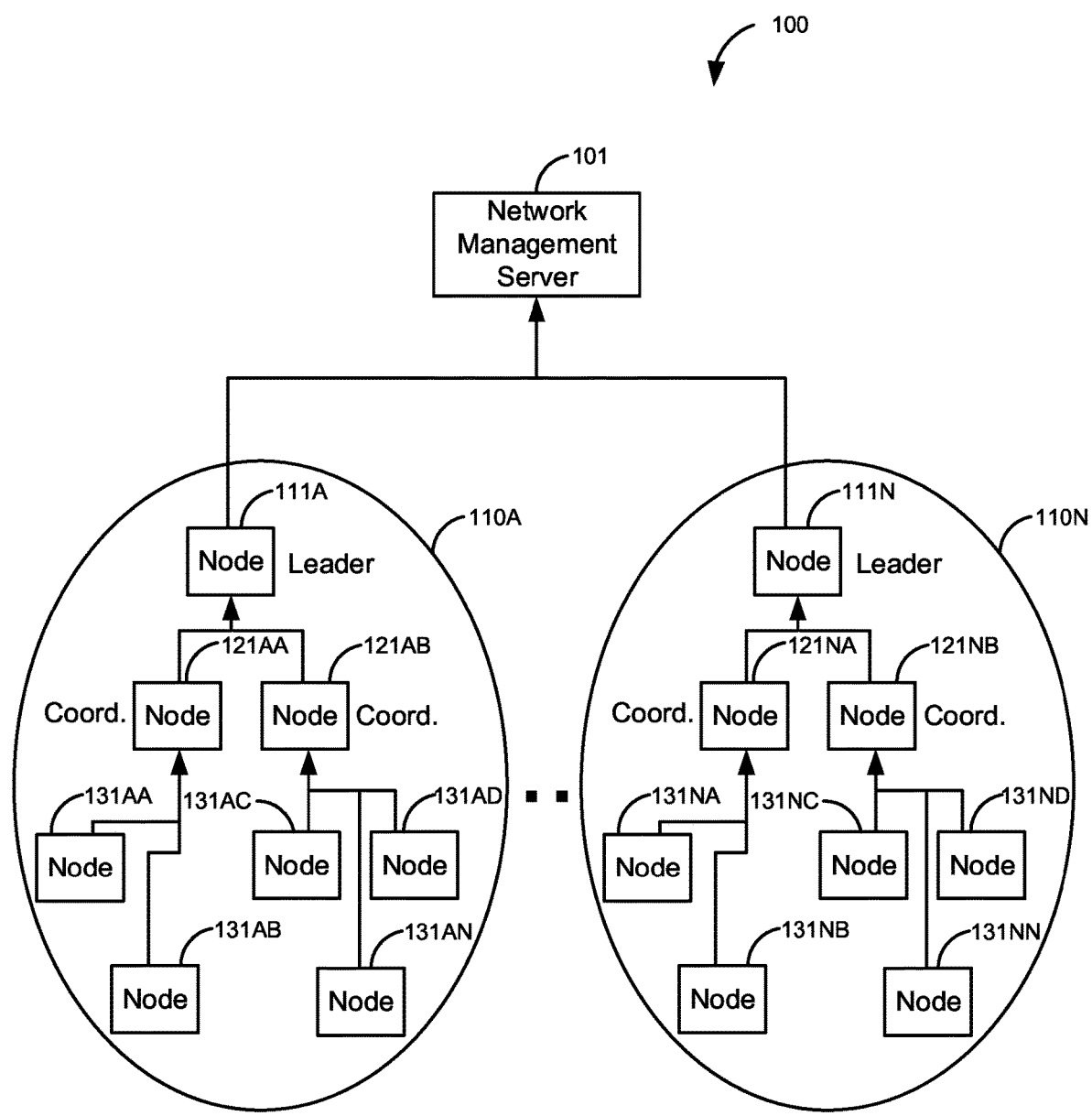
FIG. 1 is a block diagram of a first illustrative system for detection of liveness of managed nodes in a managed network.

FIG. 1 is a block diagram of a first illustrative system 100 for detection of liveness of managed nodes 131 in a managed network. The first illustrative system 100 comprises a network management server 101 and clusters 110A-110N. The network management server 101 can be or may include any hardware coupled with software that can manage the nodes 111, 121, and 131. The network management server 101 manages the detection/management of the nodes 111, 121, and 131. For example, the network management server 101 may be used to provide software updates for the nodes 111, 121, and 131.

The clusters 110A-110N can be any number of clusters 110, including a single cluster 110. The clusters 110A-110N are created by the network management server 101 based on various factors, such as, location (i.e., a proximity between the nodes 131, 121, 111), processing power, memory, operating system, networks, device type, and/or the like. The network management server 101 may create the clusters 110A-110N based on the location of the nodes 111, 121, and 131. For example, the network management server 101 may create the clusters 110A-110N based on different branch locations/buildings within a corporate network.

The nodes 111, 121, and 131 may be any communication device that can communicate on a network, such as a Personal Computer (PC), a telephone, a video system, a cellular telephone, a Personal Digital Assistant (PDA), a tablet device, a notebook device, a smartphone, a server, a printer, a sensor, a server, a gateway, a container, a virtual machine, and/or the like. For example, a managed node 131 may be a notebook device can move between different clusters 110A-110N.

The cluster 110A comprises a leader node 111A, coordinator nodes 121AA and 121AB, and managed nodes 131AA-131AN. The cluster 110N comprises a leader node 111N, coordinator nodes 121NA-121NB, and managed nodes 131NA-131NN. Although not shown, the clusters 110A-110N may comprise any number of leader nodes 111, coordinator nodes 121, and managed nodes 131. A cluster can change dynamically as the topology of the cluster 110 changes. For example, a managed node 131 may be a mobile node that is powered off and moved to a different cluster 110.

Every node 111, 121, and 131 can contact the network management server 101 directly with its liveness information. Liveness information indicates that the nodes 111, 121, and 131 are active within the cluster 110. However, if each node 111, 121, and 131 were always directly providing the liveness information to the network management server 101, the network management server 101 will quickly be overwhelmed with the number of requests if there are a large number of nodes 111, 121, 131 within the clusters 110A-110N. In addition, the liveness information may be very short lived, which exacerbates the amount of information received by the network management server 101 when managing a large network. To solve this problem, the network management server 101 responds back with cluster information when the node 111, 121, and 131 becomes active in the cluster 110. The cluster information identifies a hierarchy of nodes 111, 121, and 131.

In one embodiment, if the network management server 101 needs liveness of the nodes 111 for every time T interval, then each managed node 131 will be informed to send a heartbeat request to their respective coordinator node 121 every T/2 interval as part of the cluster information as shown below in Table 1 below.

TABLE 1

| Leader 111 | https://leader.acme.com/livereport | T/2 |
| Coordinator 121A | https://coordinator1.acme.com/livereport | T/2 |
| Coordinator 121N | https://coordinator2.acme.com/livereport | T/2 |

In one embodiment, the network management server 101 may randomize the order of coordinator nodes 121 for each managed node 131 in the cluster 110 to distribute the load within the cluster 110. Likewise, the network management server 101 may randomize the order of leader nodes 111 in the cluster 110 for the coordinator nodes 121.

Having received the cluster information, every managed node 131 in the cluster 110 will start sending a heartbeat to the coordinator nodes 121 and falling back to the leader nodes 111 and the network management server 101 in case of failures. The leader nodes 111 and the network management server 101 may treat any out of turn messages as a likely failure of a node 121, and/or 131 within the cluster 110.

The coordinator nodes 121 consolidate the liveness information of the managed nodes 131 that contact them and in turn inform their status to the leader node 111 every T/2 interval. Similarly, the leader nodes 111 consolidate the liveness reports from the coordinator nodes 121 and send it to the network management server 101. The network management server 101, upon receiving any failure requests may optionally wait for multiple confirmations and reset the cluster 110 by choosing a new leader node 111 and/or coordinator node 121 and then send a response with the cluster information. In one embodiment, new cluster information may be relayed back by the leader nodes 111 and the coordinator nodes 121 to the individual managed nodes 131. The nodes 111, 121, and 131 will have a timeout of T to detect any missing liveness information and the same will be reported to the next available node 121/111 in the hierarchy.

Thus, in FIG. 1 the managed nodes 131AA-131AB report their status to the coordinator node 121AA. The managed nodes 131AC-131AN report their status to the coordinator node 121AB. The coordinator nodes 121AA-121AB report their status and the status of the managed nodes 131AA-131AN to the leader node 111A. The leader node 111A then reports its status along with the status of the coordinator nodes 121AA-121AB/managed nodes 131AA-131AN to the network management server 101.

Likewise, the managed nodes 131NA-131NB report their status to the coordinator node 121NA. The managed nodes 131NC-131NN report their status to the coordinator node 121NB. The coordinator nodes 121NA-121NB report their status and the status of the managed nodes 131NA-131NN to the leader node 111N. The leader node 111N then reports its status along with the status of the coordinator nodes 121NA-121NB/managed nodes 131NA-131NN to the network management server 101.

Although FIG. 1 only shows three levels in the hierarchy of each cluster 110A-110N, there may be any number of levels in the hierarchy. For example, there may be one or more additional nodes between the leader node 111 and the network management server 101 that provide a similar hierarchical structure/reporting scheme.

Figure 2:
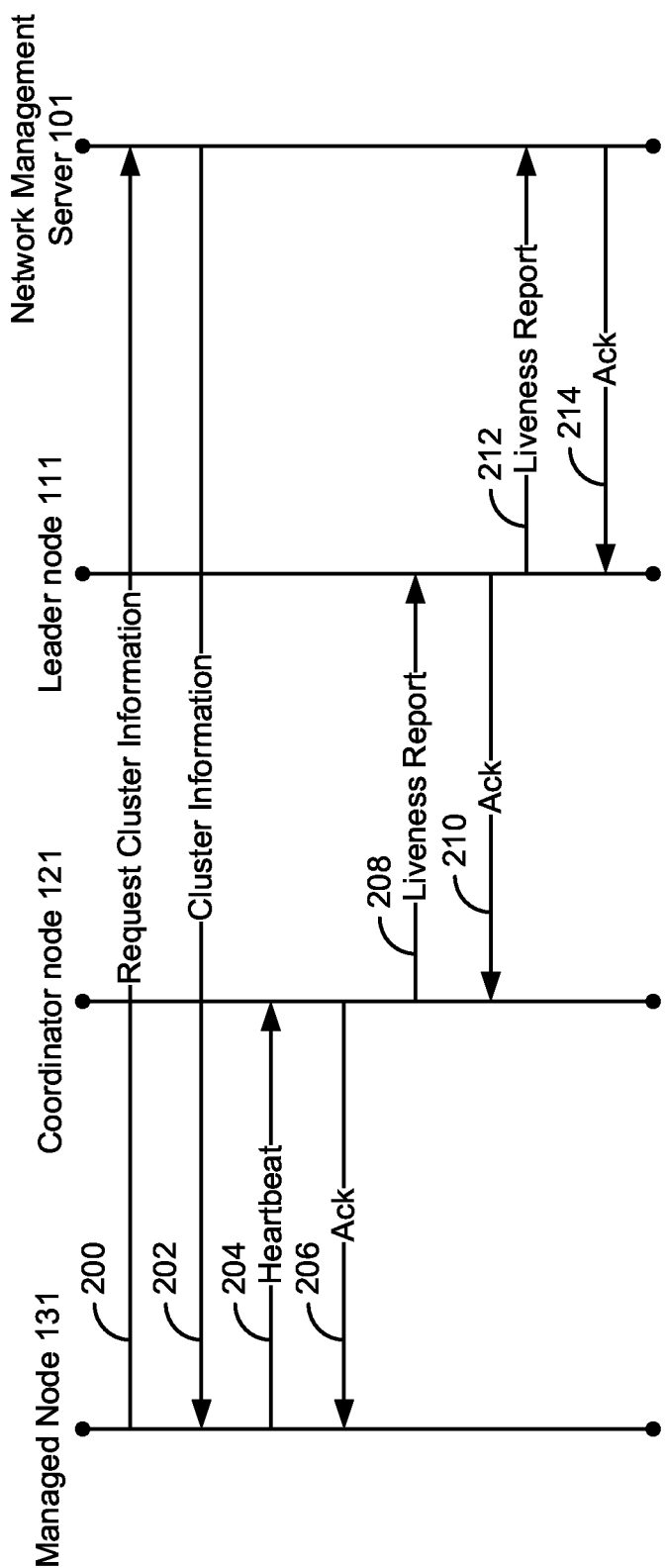
FIG. 2 is a flow diagram of a process for getting cluster information when a managed node becomes active on a managed network.

FIG. 2 is a flow diagram of a process for getting cluster information when a managed node 131 becomes active on a managed network. Illustratively, the network management server 101, the leader nodes 111A-111N, the coordinator nodes 121AA, 121AB, 121NA, 121NB, and the managed nodes 131AA-131NN are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The typically process starts when a managed node 131 becomes active within the cluster 110. For example, a user may turn on their laptop computer at a network location within the cluster 110. The managed node 131 sends a request for cluster information message to the network management server 101 in step 200. Although not shown, the managed node 131 will have the address of the network management server 101. For example, the managed node 131 may have a user provide the address of the network management server 101 upon installing a program for managing the managed node 131. Alternatively, the managed node 131 may send a broadcast message to any coordinator nodes 121 to get the address of the network management server 101. In response to sending the request to get the cluster information in step 200, the network management server 101 sends the cluster information in step 202. The cluster information contains the addresses/information of the managed node 131's coordinator node 121/leader node 111.

The managed node 131 sends, in step 204, a heartbeat message to the coordinator node 121. The heartbeat message of step 204 provide status information about the managed node 131. For example, the heartbeat message of step 204 may contain information about the manage device 131, such as, device type, software/firmware versions, address information, hardware information, and/or the like. The coordinator node 121 sends an acknowledgement message, in step 206, to the managed node 131. The coordinator node 121 sends a liveness report message to the leader node 111 in step 208. The liveness report message of step 208 typically will include the liveness status of all the managed nodes 131 that report to the coordinator node 121. For example, for the coordinator node 121AA of FIG. 1, the liveness report of step 208, typically will include liveness reports for the managed nodes 131AA and 131AB. The leader node 111, acknowledges the liveness report in step 210.

The leader node 111 sends a liveness report, in step 212, to the network management server 101. The liveness report of step 212 typically will include the liveness status of all the coordinator nodes 121 that report to the leader node 111. For example, for the leader node 111A of FIG. 1, the liveness report of step 212 typically will include liveness reports for managed nodes 131AA, 131AB, 131AC, 131AD, 131AN along with liveness reports for both of the coordinator nodes 121AA and 121AB. The network management server 101, acknowledges the liveness report of step 212 in step 214.

Figure 3:
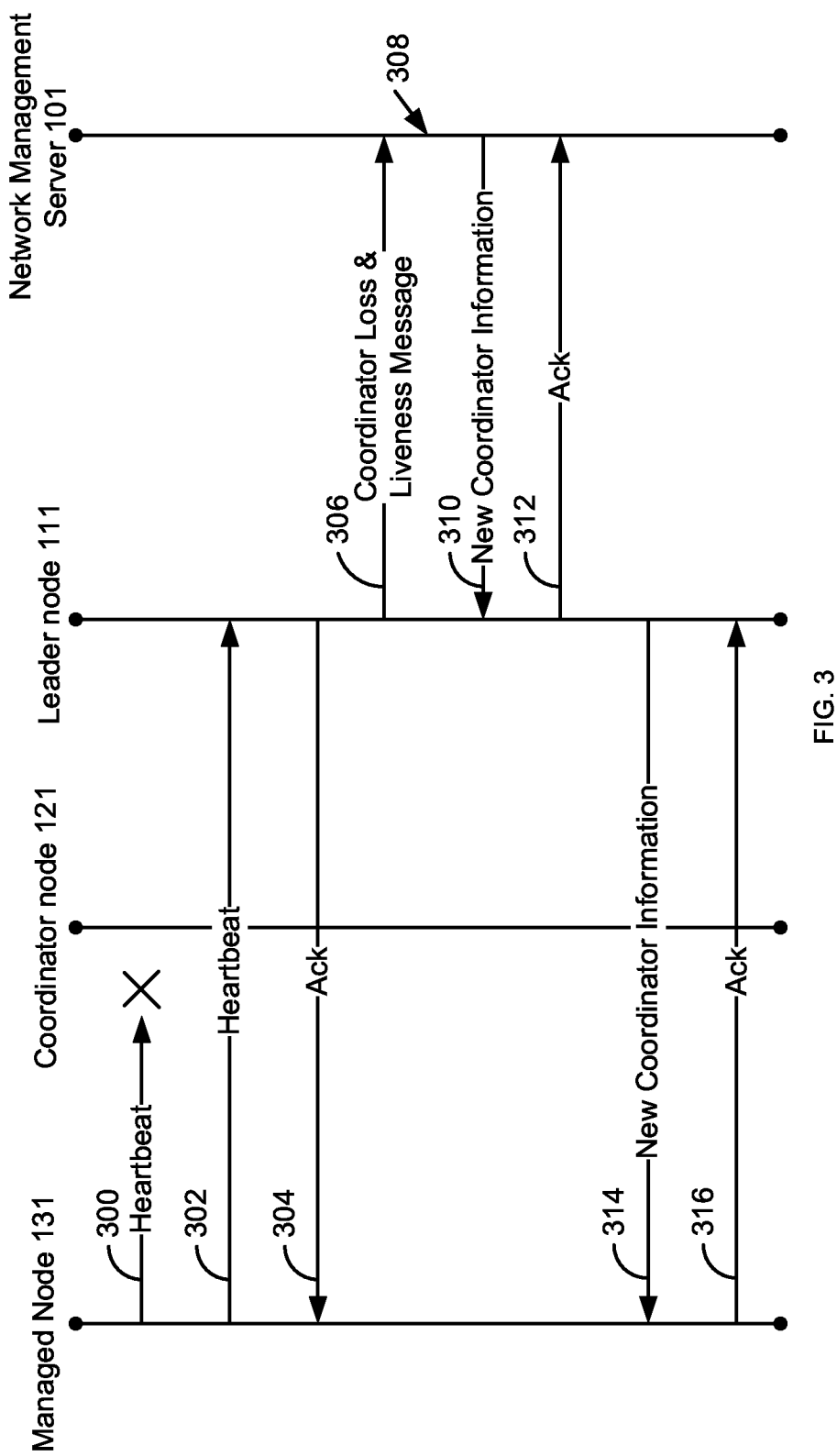
FIG. 3 is a flow diagram of a process for detecting when a coordinator node fails.

FIG. 3 is a flow diagram of a process for detecting when a coordinator node 121 fails. The managed node 131 sends a heartbeat message to the coordinator node 121 in step 300. For example, the heartbeat message of step 300 may come later the heartbeat message of step 204. In FIG. 3, the coordinator node 121 has either failed, or is not reachable (e.g., there is a network failure). Since the coordinator node 121 has failed or is not reachable, there is no acknowledgement message received by the managed node 131. In response to not receiving the acknowledgement message, the managed node 131 sends a heartbeat message to the leader node 111 in step 302. The leader node 111 may optionally acknowledge the heartbeat message in step 304 (in one embodiment, the message of step 314 may serve as the acknowledgment message).

The leader node 111 sends a coordinator loss and liveness message to the network management server 101 in step 306. The network management server 101 elects a new coordinator node 121 in step 308. In one embodiment, a new leader node 111 may also be elected in step 308. For example, the network topology may have changed, thus requiring a change in the leader node 111 as well. The network management server 101 sends a new coordinator information message to the leader node 111 in step 310. The leader node 111 acknowledges the new coordinator information message in step 312. The leader node 111 sends the new coordinator information message to the managed node 131 in step 314. This allows the managed node 131 to send the next heartbeat message to the new coordinator node 121. The managed node 131 acknowledges the new coordinator message in step 316.

In one embodiment, instead of the network management server 101 deciding the coordinator node 121, the managed nodes 131 that report to the coordinator node 121 may elect a new coordinator node 121 amongst themselves. For example, if the coordinator node 121AB failed, the managed nodes 131AC, 131AD, and 131AN would elect one of the managed nodes 131AC, 131AD, or 131AN as the new coordinator node 121. This is then reported to the leader node 111A and the network management server 101 respectively.

Figure 4:
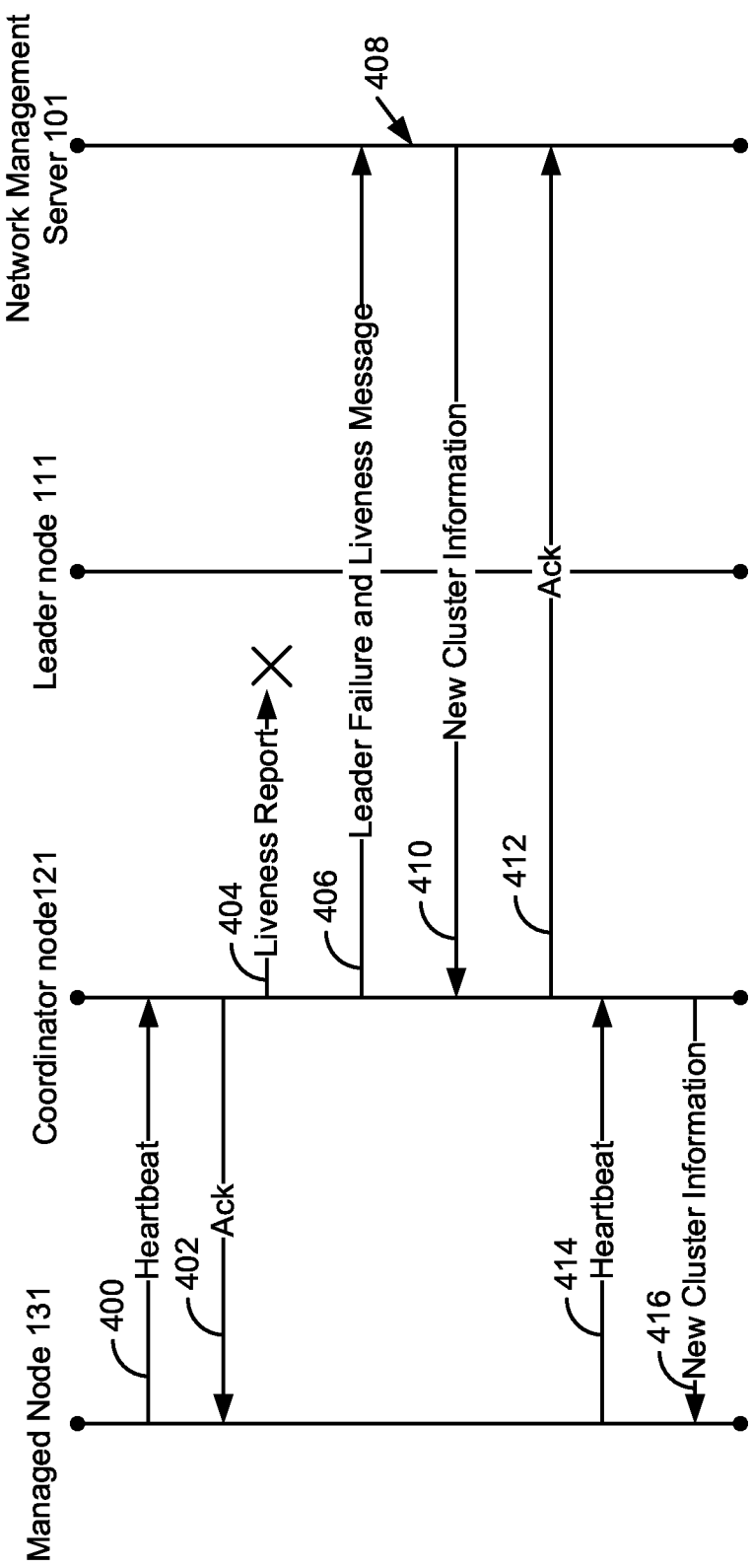
FIG. 4 is a flow diagram of a process for detecting when a leader node fails.

FIG. 4 is a flow diagram of a process for detecting when a leader node 111 fails. The managed node 131 sends, in step 400, a heartbeat message to the coordinator node 121. The coordinator node 121 acknowledges the heartbeat message of step 400 in step 402. The coordinator node sends a liveness report message to the leader node 111 in step 404. In FIG. 4, the leader node 111 has either failed, or is not reachable (e.g., there is a network failure). Since the leader node 111 has failed or is not reachable, there is no acknowledgement received by the coordinator node 121.

The coordinator node 121 sends a leader failure and liveness message to the network management server 101 in step 406. The network management server 101 generates new cluster information in step 408. The new cluster information includes a new leader node 111. The network management server 101 sends, in step 410, the new cluster information to the coordinator node 121. The coordinator node 121 acknowledges the new cluster information message in step 412.

The managed node 131 sends, in step 414, a heartbeat message. To acknowledge the heartbeat message of 414, the coordinator node 121 sends the new cluster information (including the new leader node 111) to the managed node 131. The managed node 131 now has the new leader node 111 to use if the coordinator node 121 fails or is unreachable.

In one embodiment, the coordinator node 121 may not wait for the heartbeat message of step 414. Instead the coordinator node 121 automatically sends the new cluster information after receiving the new cluster information in step 410.

Figure 5:
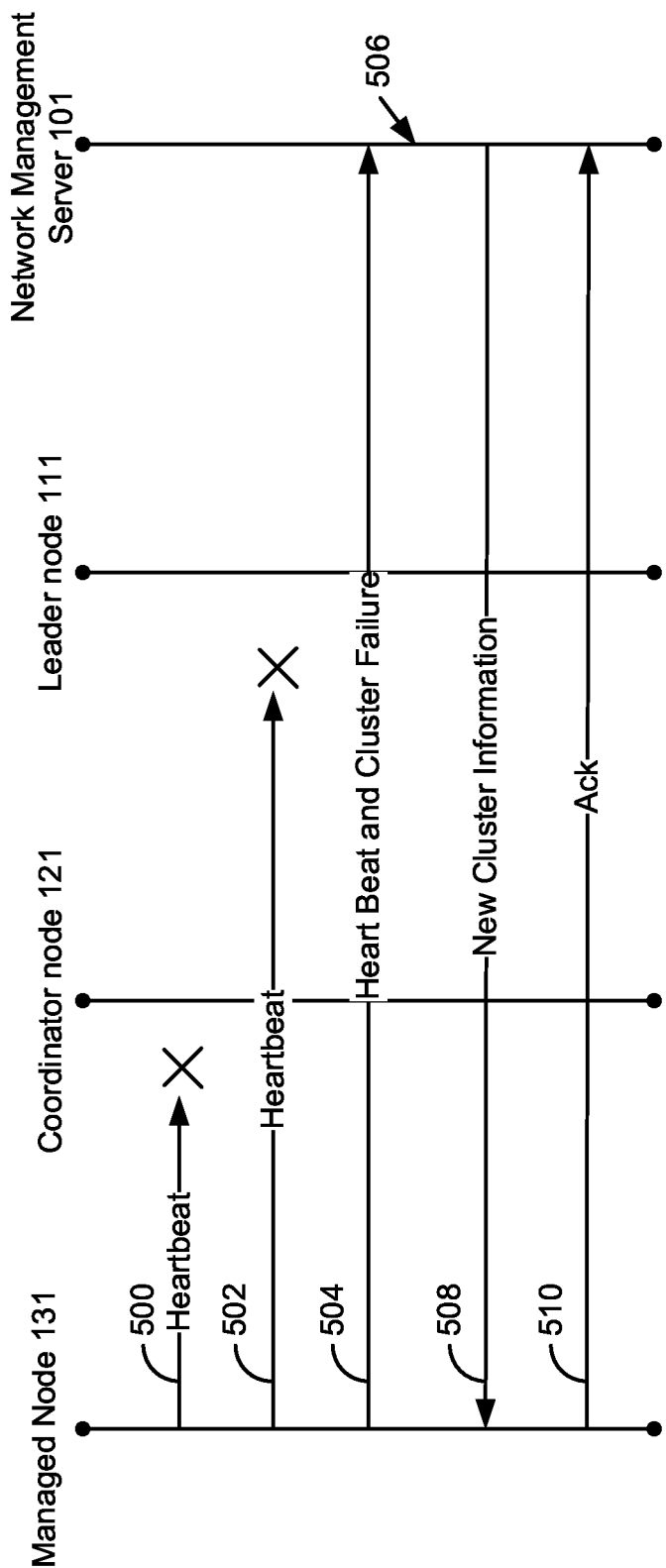
FIG. 5 is a flow diagram of a process for detecting when both a coordinator node and a leader node fail.

FIG. 5 is a flow diagram of a process for detecting when both a coordinator node 121 and a leader node 111 fail. The process starts in step 500, when the managed node 131 sends a heartbeat message to the coordinator node 121. In FIG. 5, the coordinator node 121 has either failed, or is not reachable (e.g., there is a network failure). Since the coordinator node 121 has failed or is not reachable, there is no acknowledgement received by the managed node 131. In response to not receiving the acknowledgement message, the managed node 131 sends a heartbeat message to the leader node 111 in step 502. In FIG. 5, the leader node 111 has also either failed, or is not reachable (e.g., there is a network failure). Since the leader node 111 has failed or is not reachable, there is no acknowledgement received by the coordinator node 121.

The managed node 131 sends a heartbeat and cluster failure message to the network management server 101 in step 504. The heartbeat and cluster failure message indicates that the managed node 131 cannot reach the coordinator node 121 or the leader node 111 in the cluster 110. The network management server 101 generates new cluster information in step 506. The new cluster information includes a new leader node 111 and a new coordinator node 121. The network management server 101 sends a new cluster information message to the managed node 131 in step 508. The managed node 131 acknowledges the new cluster information message in step 510. At this point, the managed node 131 can now start sending heartbeat messages to the coordinator node 121 like described in FIG. 2.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A network management server comprising:
   a microprocessor; and
   a computer readable medium, coupled with the microprocessor and comprising microprocessor readable and executable instructions that, when executed by the microprocessor, cause the microprocessor to:
   receive a request, from a selected managed node, to get cluster information corresponding to the selected managed node, wherein:
      the cluster information identifies, for a corresponding cluster, a hierarchical structure comprising a plurality of groupings of managed nodes, a plurality of coordinator nodes, each coordinator node corresponding to a respective one of the plurality of groupings of managed nodes, and at least one leader node monitoring the plurality of coordinator nodes;
      the cluster information corresponding to the selected managed node comprises first and second electronic addresses that identify respectively a selected coordinator node of the plurality of coordinator nodes that monitors a managed node grouping comprising the selected managed node and a leader node that, with the selected coordinator node, monitors a liveness of each managed node in the managed node grouping comprising the selected managed node;

in response to receiving a heartbeat signal from the selected managed node, the selected coordinator node consolidates livenesses of the managed nodes in the managed node grouping and sends a first liveness status message comprising a liveness status of the selected managed node and at least one other managed node in the managed node grouping comprising the selected managed node to the leader node; and in response to receiving the first liveness status message, the leader node sends a second liveness status message of the selected managed node to the network management server, wherein the second liveness status message gives the network management server a status of each of the plurality of managed nodes in the corresponding cluster; and in response to the request, send the cluster information to the selected managed node.

2. The network management server of claim 1, wherein the selected managed node sends a first heartbeat message to the corresponding coordinator node, wherein the corresponding coordinator node fails to respond to the first heartbeat message, and wherein in response to the corresponding coordinator node failing to respond to the first heartbeat message, the selected managed node sends a second heartbeat message to a leader node monitoring the selected managed node.

3. The network management server of claim 2, wherein the leader node monitoring the selected managed node sends a coordinator loss/liveness message to the network management server, wherein the network management server sends a new coordinator information message to the leader node monitoring the selected managed node, and wherein the leader node monitoring the selected managed node sends a new coordinator message to the selected managed node.

4. The network management server of claim 1, wherein members of a group of managed nodes within a cluster elect a new coordinator node within the cluster in response to the corresponding coordinator node failing.

5. The network management server of claim 1, wherein the leader node monitoring the selected managed node fails to respond to the first liveness status message, wherein the corresponding coordinator node sends a leader failure message and a third liveness status message to the network management server, and wherein the network management server sends new cluster information to the corresponding coordinator node.

6. The network management server of claim 1, wherein the cluster information is based on a proximity between the selected managed node, the corresponding coordinator node, and the leader node monitoring the selected managed node.

7. The network management server of claim 1, wherein there are a plurality of coordinator nodes and a plurality of leader nodes and wherein the selected managed node is a mobile device that is managed by the plurality of coordinator nodes as the managed node moves between different clusters.

8. The network management server of claim 1, wherein the selected managed node sends a first heartbeat message to the corresponding coordinator node, wherein the corresponding coordinator node fails to respond to the first heartbeat message, wherein the selected managed node sends a second heartbeat message to the leader node monitoring the selected managed node, wherein the leader node monitoring the selected managed node fails to respond to the second heartbeat message, and wherein the selected managed node sends a heartbeat and cluster failure message to the network management server.

9. A method comprising:

receiving, by a microprocessor, a request, from a selected managed node, to get cluster information corresponding to the selected managed node, wherein:

the cluster information identifies, for a corresponding cluster, a hierarchical structure comprising a plurality of groupings of managed nodes, a plurality of coordinator nodes, each coordinator node corresponding to a respective one of the plurality of groupings of managed nodes, and at least one leader node monitoring the plurality of coordinator nodes;

the cluster information corresponding to the selected managed node comprises first and second electronic addresses that identify respectively a selected coordinator node of the plurality of coordinator nodes that monitors a managed node grouping comprising the selected managed node and a leader node that, with the selected coordinator node, monitors a liveness of each managed node in the managed node grouping comprising the selected managed node;

in response to receiving a heartbeat signal from the selected managed node, the selected coordinator node consolidates livenesses of the managed nodes in the managed node grouping and sends a first liveness status message comprising a liveness status of the selected managed node and at least one other managed node in the managed node grouping comprising the selected managed node to the leader node; and in response to receiving the first liveness status message, the leader node sends a second liveness status message of the selected managed node to the network management server, wherein the second liveness status message gives the network management server a status of each of the plurality of managed nodes in the corresponding cluster; and in response to the request, sending, by the microprocessor, the cluster information to the selected managed node.

10. The method of claim 9, wherein the selected managed node sends a first heartbeat message to the corresponding coordinator node, wherein the corresponding coordinator node fails to respond to the first heartbeat message, and wherein in response to the corresponding coordinator node failing to respond to the first heartbeat message, the selected managed node sends a second heartbeat message to a leader node monitoring the selected managed node.

11. The method of claim 10, wherein the leader node monitoring the selected managed node sends a coordinator loss/liveness message to the network management server, wherein the network management server sends a new coordinator information message to the leader node monitoring the selected managed node, and wherein the leader node monitoring the selected managed node sends a new coordinator message to the selected managed node.

12. The method of claim 9, wherein members of a group of managed nodes within a cluster elects a new coordinator node within a cluster in response to the corresponding coordinator node failing.

13. The method of claim 9, wherein the leader node monitoring the selected managed node fails to respond to the first liveness status message, wherein the corresponding coordinator node sends a leader failure message and a third liveness status message to the network management server, and wherein the network management server sends new cluster information to the corresponding coordinator node.

14. The method of claim 9, wherein the cluster information is based on a proximity between the selected managed node, the corresponding coordinator node, and the leader node monitoring the selected managed node.

15. The method of claim 9, wherein there are a plurality of coordinator nodes and a plurality of leader nodes and wherein the selected managed node is a mobile device that is managed by the plurality of coordinator nodes as the managed node moves between different clusters.

16. The method of claim 9, wherein the selected managed node sends a first heartbeat message to the corresponding coordinator node, wherein the corresponding coordinator node fails to respond to the first heartbeat message, wherein the selected managed node sends a second heartbeat message to the leader node monitoring the selected managed node, wherein the leader node monitoring the selected managed node fails to respond to the second heartbeat message, and wherein the selected managed node sends a heartbeat and cluster failure message to the network management server.

17. A non-transient computer readable medium having stored thereon instructions that cause a processor to execute a method, the method comprising instructions to:
 receive a request, from a selected managed node, to get cluster information corresponding to the selected managed node, wherein:
  the cluster information identifies, for a corresponding cluster, a hierarchical structure comprising a plurality of groupings of managed nodes, a plurality of coordinator nodes, each coordinator node corresponding to a respective one of the plurality of groupings of managed nodes, and at least one leader node monitoring the plurality of coordinator nodes;
  the cluster information corresponding to the selected managed node comprises first and second electronic addresses that identify respectively a selected coordinator node of the plurality of coordinator nodes that monitors a managed node grouping comprising the selected managed node and a leader node that, with the selected coordinator node, monitors a liveness of each managed node in the managed node grouping comprising the selected managed node;
 in response to receiving a heartbeat signal from the selected managed node, the selected coordinator node consolidates livenesses of the managed nodes in the managed node grouping and sends a first liveness status message comprising a liveness status of the selected managed node and at least one other managed node in the managed node grouping comprising the selected managed node to the leader node; and
 in response to receiving the first liveness status message, the leader node sends a second liveness status message of the selected managed node to the network management server, wherein the second liveness status message gives the network management server a status of each of the plurality of managed nodes in the corresponding cluster; and
 in response to the request, send the cluster information to the selected managed node.

18. The non-transient computer readable medium of claim 17, wherein the selected managed node sends a first heartbeat message to the corresponding coordinator node, wherein the corresponding coordinator node fails to respond to the first heartbeat message, and wherein in response to the corresponding coordinator node failing to respond to the first heartbeat message, the selected managed node sends a second heartbeat message to a leader node monitoring the selected managed node.

19. The non-transient computer readable medium of claim 18, wherein the leader node monitoring the selected managed node sends a coordinator loss/liveness message to the network management server, wherein the network management server sends a new cluster information message to the leader node monitoring the selected managed node, and wherein the leader node monitoring the selected managed node sends a new coordinator message to the selected managed node.

20. The non-transient computer readable medium of claim 17, wherein the selected managed node sends a first heartbeat message to the corresponding coordinator node, wherein the corresponding coordinator node fails to respond to the first heartbeat message, wherein the selected managed node sends a second heartbeat message to the leader node monitoring the selected managed node, wherein the leader node monitoring the selected managed node fails to respond to the second heartbeat message, and wherein the selected managed node sends a heartbeat and cluster failure message to the network management server.

* * * * *